(12) United States Patent
Yoon et al.

(10) Patent No.: US 8,607,341 B2
(45) Date of Patent: Dec. 10, 2013

(54) METHOD AND SYSTEM FOR PRESERVING SECURITY OF SENSOR DATA AND RECORDING MEDIUM USING THEREOF

(75) Inventors: Mi Yeon Yoon, Seoul (KR); Mi Joo Kim, Incheon (KR); Hyun Cheol Jeong, Seoul (KR)

(73) Assignee: Korea Internet & Security Agency, Seoul (KR)

( * ) Notice: Subject to any disclaimer, the term of this patent is extended or adjusted under 35 U.S.C. 154(b) by 251 days.

(21) Appl. No.: 12/913,891

(22) Filed: Oct. 28, 2010

(65) Prior Publication Data

US 2011/0103583 A1 May 5, 2011

(30) Foreign Application Priority Data

Oct. 29, 2009 (KR) ........................ 10-2009-0103535

(51) Int. Cl.
*G06F 11/00* (2006.01)
(52) U.S. Cl.
USPC ............................................................ 726/22
(58) Field of Classification Search
USPC ............................................................ 726/22
See application file for complete search history.

(56) References Cited

U.S. PATENT DOCUMENTS

| | | | |
|---|---|---|---|
| 5,892,900 A * | 4/1999 | Ginter et al. | 726/26 |
| 7,181,014 B1 * | 2/2007 | Srivastava | 380/278 |
| 2007/0036353 A1 * | 2/2007 | Reznik et al. | 380/30 |
| 2008/0317436 A1 * | 12/2008 | Sasamoto et al. | 386/95 |
| 2009/0168792 A1 * | 7/2009 | Veits | 370/412 |

\* cited by examiner

*Primary Examiner* — Carl Colin
*Assistant Examiner* — John Elmore
(74) *Attorney, Agent, or Firm* — Ohlandt, Greeley, Ruggiero & Perle, LLP

(57) ABSTRACT

A method and a system for preserving sensor data based on a time key, and a recording medium thereof are provided. The time key based sensor data security preserving method includes encrypting the sensor data with an encryption key obtained using a time key based polynomial derived using random numbers and a secret key which is shared by a sensor node and an application system; and decrypting the encrypted sensor data with a decryption key obtained by deriving the same polynomial as the time key based polynomial using the random numbers and the secret key. Thus, integrity and confidentiality of the sensor data can be preserved.

19 Claims, 8 Drawing Sheets

METHOD AND SYSTEM FOR PRESERVING SECURITY OF SENSOR DATA AND RECORDING MEDIUM USING THEREOF

CROSS-REFERENCE TO RELATED APPLICATION

This application claims the benefit under 35 U.S.C. §119 (a) from Korean Patent Application No. 10-2009-0103535 filed on Oct. 29, 2009 in the Korean Intellectual Property Office, the entire disclosure of which is incorporated herein by reference.

BACKGROUND OF THE INVENTION

1. Field of the Invention

The present invention generally relates to a method and a system for preserving security of sensor data, and a recording medium using the same. More particularly, the present invention relates to a method and a system for preserving security of sensor data to keep integrity and confidentiality of the sensor data in a ubiquitous sensor network, and a recording medium thereof.

2. Description of the Related Art

A Ubiquitous Sensor Network (USN) is a base network for implementing ubiquitous computing and is a wireless network including a number of ultra-light and low-power sensors. The USN technology, which can be the aim of an RFID tag, is subject to sensor network configuration which can scan its vicinity by itself and distribute information. The USN technology recognizes person, object, and environment information from sensor nodes installed at various locations, combines and processes the recognized information, and offers an information service infrastructure to use the information safely and freely at any time and anywhere.

Security issues in the USN environment relate characteristics of devices wirelessly transmitting and receiving data, and computing capability and power management of the devices, and are more complicated than the security problem in a conventional network. Attack on the equipment of the USN is quite easy, but defense against this attack is much more complicated than a conventional method.

Requirements in the UNS security include, representatively, confidentiality, integrity, and authentication. To overcome threat of eavesdropping in the sensor node, it is necessary to keep the confidentiality by encrypting and sending information the sensor node. To overcome forging and falsification of the sensed data, it is necessary to keep the integrity by blocking information received from the sensor node from being compromised in the process of the transmission and the communication of the sensor node needs to be preceded by mutual authentication.

The security technology of the USN can be approached largely by cryptographic algorithm, key management, and routing security.

As for the cryptographic algorithm, conventional symmetric-key based international standard cryptographic algorithms such as AES, DES and SEED are not appropriate, and it is necessary to develop a Hash function suitable for low-power computation environments (Smart Dust, RFID). As for the routing, researches are under way to address energy consumption of the sensor network and to enhance reliability in the data transmission. The application of the cryptographic algorithms and the safe routing can be adopted easily after addressing the sharing problem of a session key, and its security can be guaranteed. Accordingly, the key management for safely pre-distributing keys in a broadcasting manner is to be addressed first of all.

In the key management, a node in the USN environment is not authenticated by a reliable certification authority. Thus, when the routing is conducted in a multi-hop manner, the integrity and the confidentiality of the data can be compromised by a malicious intermediate node. When the security problem is addressed, the computing problem arises and imposes extreme load on the node and the entire network. Hence, it is necessary to develop algorithm, key distribution, and authentication protocol suited to the USN.

In this regard, a method for preventing the key value of the sensor from exposing is required. Although the key value is exposed, a method for protecting the information collected by the sensor is demanded.

SUMMARY OF THE INVENTION

The present invention has been provided to address the above-mentioned and other problems and disadvantages occurring in the conventional arrangement, and an aspect of the present invention provides a method for preserving security of sensor data based on a time key to keep integrity and confidentiality of the sensor data in a ubiquitous sensor network.

Another aspect of the present invention provides a system for preserving security of sensor data based on a time key to keep integrity and confidentiality of the sensor data in a ubiquitous sensor network.

Yet another aspect of the present invention provides a recording medium containing a program to execute a method for preserving security of sensor data based on a time key in a ubiquitous sensor network.

According to an aspect of the present invention, a method for preserving security of sensor data based on a time key includes encrypting the sensor data with an encryption key obtained using a time key based polynomial derived using random numbers and a secret key which is shared by a sensor node and an application system; and decrypting the encrypted sensor data with a decryption key obtained by deriving the same polynomial as the time key based polynomial using the random numbers and the secret key.

The sensor data security preserving method may further include sending the time key and the encrypted sensor data from the sensor node to a sink node; and sending the encrypted sensor data and the time key to the application system.

The time key may be generated using sensor data collection time information, and may be an input value of the time key based polynomial which produces an encryption key material value used to generate the encryption key as an output value.

The encrypting of the sensor data with the encryption key obtained using the time key based polynomial may include generating an application random number p and a sink random number q; encrypting the generated random numbers with an initial group key of a sensor and sending the encrypted random numbers to the sensor; deriving the time key based polynomial to generate a sensor data encryption key at the sensor node; generating, at the sensor node, the sink node, and the application system, the authentication key using the sink random number q; and generating the encryption key by applying the encryption key material value calculated using the time key based polynomial to a cryptographic algorithm of the sensor node.

The encrypting and sending of the random numbers may include sending the application random number p from the application system to the sensor node; and sending the sink random number q from the sink node to the application system and the sensor node.

The deriving of the time key based polynomial may include calculating two coordinates $(p_x, p_y)$ and $(q_x, q_y)$ which are roots of the following quadratic polynomial using the application random number p and the sink random number q; and deriving the following equation using the two coordinates and a secret key shared by the sensor node and the application, $$y=|ax^2+bx+C|$$

where y, which is an output value for a time key input, is the material value used to generate the encryption key, a and b are coefficients of the quadratic polynomial, x is a certain time key value, C is the secret key value as a constant value of the quadratic polynomial, and |x| denotes an absolute value of x.

The calculating of the coordinates may include concatenating the application random number p and the sink random number q; remainder-operating results of the concatenation and the secret key; and calculating coordinates by applying a Hash function to the remainder operation results.

The application random number p, the sink random number q, and the time key x may be updated periodically, and an update period of the time key may be shorter than an update period of the random numbers p and q.

The decrypting of the sensor data may include deriving the same polynomial as the time key based polynomial generated at the sensor node; generating the decryption key by applying a decryption key material value obtained from the time key based polynomial to a cryptographic algorithm of the application system; and decrypting the encrypted sensor data with the generated decryption key.

The sending of the encrypted sensor data and the encrypted time key to the application system may transmit the encrypted sensor data on a periodic basis or according to a request of the application system.

The sending of the encrypted sensor data and the encrypted time key to the application system may maintain a constant packet length by adding the time key to a sensor data packet. When the time key is updated to a new time key, the updated time key may be added to the sensor data packet and 0 transmitted.

Whether the new time key is contained may be determined by a flag of the sensor data packet.

When the time key is not updated, the sensor data may be added by the constant packet length and transmitted.

The sensor node may have the initial group key recognized by the application system and the sink node, and a private key.

The sensor node may share the secret key with the application system.

According to another aspect of the present invention, a system for preserving security of sensor data based on a time key includes a sensor node for encrypting the sensor data with an encryption key obtained using a time key based polynomial derived using a random number and a secret key; and an application system for decrypting the encrypted sensor data with a decryption key obtained by deriving the same polynomial as the time key based polynomial using the random number and the secret key.

The sensor data security preserving system may further include a sink node for authenticating a time key and the encrypted sensor data received from the sensor node, and sending the sensor data and the time key to the application system.

The time key may be generated using sensor data collection time information, and may be an input value of the time key based polynomial which produces an encryption key material value as an output value.

The sensor node may include an RF module for collecting sensor data and receiving random numbers from the application system and the sink node; a sensor data storage part for storing the sensor data; an authentication part for generating an authentication key by applying the random number to a Hash function; and an encryption part for generating an encryption key using the random number and the time key.

The encryption part may include a time key generator for generating the time key using time information according to a certain rule; a concatenation operator for concatenating and splitting the random number to two random numbers; a remainder operator for performing remainder operation by dividing results of the concatenation by a secret key; a Hash function operator for obtaining coordinates by applying the Hash function to results of the remainder operation; a time key based polynomial generator for generating a quadratic polynomial which produces an encryption key material value y using the coordinates and the secret key; and an encryption key generator for generating an encryption key by applying the encryption key material value to a cryptographic algorithm used by the sensor node.

The application system may include an RF module for receiving the sensor data and the time key; an authentication part for generating an authentication key by applying the random number to a Hash function, and verifying the time key and the sensor data using the authentication key; a decryption part for generating a decryption key using the random number and the time key; and a sensor data analyzer for analyzing the sensor data using the decryption key.

The decryption part may include a concatenation operator for concatenating and splitting the random number into two random numbers; a remainder operator for performing remainder operation by dividing results of the concatenation by a secret key; a Hash function operator for obtaining coordinates by applying the Hash function to results of the remainder operation; a time key based polynomial generator for generating a quadratic polynomial which produces a decryption key material value y using the coordinates and the secret key; and a decryption key generator for generating a decryption key by applying the decryption key material value to a cryptographic algorithm used by the application system.

According to yet another aspect of the present invention, a recording medium contains a program to execute the time key based sensor data security preserving method according to any one of claims 1 to 15 in a computer system which controls a ubiquitous sensor network. The recording medium is readable by the computer system.

Additional and/or other aspects and advantages of the invention will be set forth in part in the description which follows and, in part, will be obvious from the description, or may be learned by practice of the invention.

BRIEF DESCRIPTION OF THE DRAWING FIGURES

These and/or other aspects and advantages of the present general inventive concept will become apparent and more readily appreciated from the following description of the embodiments, taken in conjunction with the accompanying drawings of which:

DETAILED DESCRIPTION OF THE EXEMPLARY EMBODIMENTS

Figure 1A:
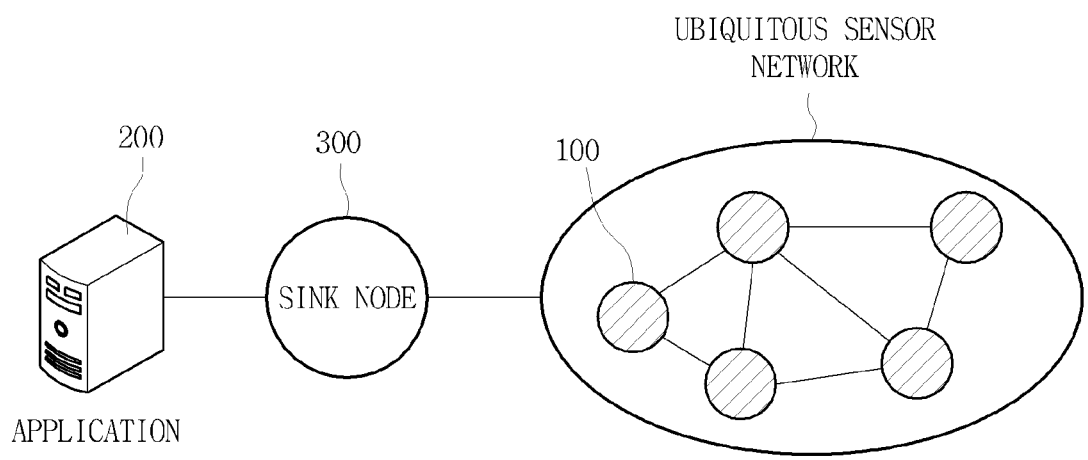
FIG. 1 is a simplified diagram of a time key based key management system in a ubiquitous sensor network according to an exemplary embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1B:
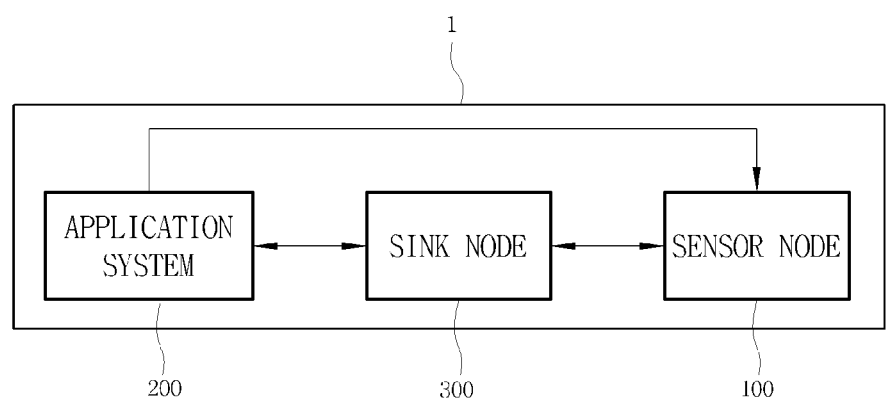

FIG. 1A is a simplified diagram of a time key based sensor data security preserving system according to an exemplary embodiment of the present invention, and FIG. 1B is a simplified block diagram of the sensor data security preserving system of FIG. 1A.

Referring to FIGS. 1A and 1B, the time key based sensor data security preserving system 1 according to an exemplary embodiment of the present invention includes a sensor node 100, an application system 200, and a sink node 300.

The sensor node 100, which is a basic entity for collecting information. A plurality of the sensor nodes 100 configures a ubiquitous sensor network. The sensor node 100 derives a time key based polynomial expression using a random number generated by the application system 200 and the sink node 300, and a secret key C shared with the application system 200. By obtaining an encryption key from the derived polynomial, sensor data collected by the sensor node 100 is encrypted. The encrypted sensor data is transmitted to the sink node 300 together with the time key.

The sink node 300 generates an authentication key Kq using its generated random number q, verifies and gathers a message value received from the sensor node 100, and forwards the encrypted sensor data and the time key received from the sensor node 100 to the application system 200.

The application system 200 is a system for utilizing the sensor data collected by the sensor node 100. The application system 200 can configure the sensor network including a plurality of sensors for a specific purpose. When receiving the encrypted sensor data and the time key from the sink node 300, the application system 200 derives the same polynomial as the time key based polynomial derived at the sensor node 100 to generate the sensor data encryption key, using its generated random number p, the random number q received from the sink node 300, and the secret key C shared with the sensor node 100, and decrypts the sensor data by generating a decryption key to decrypt the received encrypted sensor data.

As stated above, the sensor data collected by the sensor node 100 is forwarded to the application 200 via the sink node 300. The sensor node 100 and the application system 200 which share their random numbers p and q and the secret key C, can derive the same time key based polynomial to generate the encryption key or the decryption key. However, since the sink node 300 has only its generated random number q, the sensor node 100 and the application 200 do not share the key for deriving the time key based polynomial.

Even when the random number p is exposed to the sink node 300, it is impossible to derive the time key based polynomial at the end because the secret key C is not shared. Thus, the sensor data can be delivered from the sensor node 100 to the application 200 via the sink node 300 while preserving the confidentiality and the integrity of the data. The delivery of the sensor data from the sensor node 100 to the application system 200 with the confidentiality and the integrity preserved, is described by referring to FIGS. 2 through 8.

Figure 2:
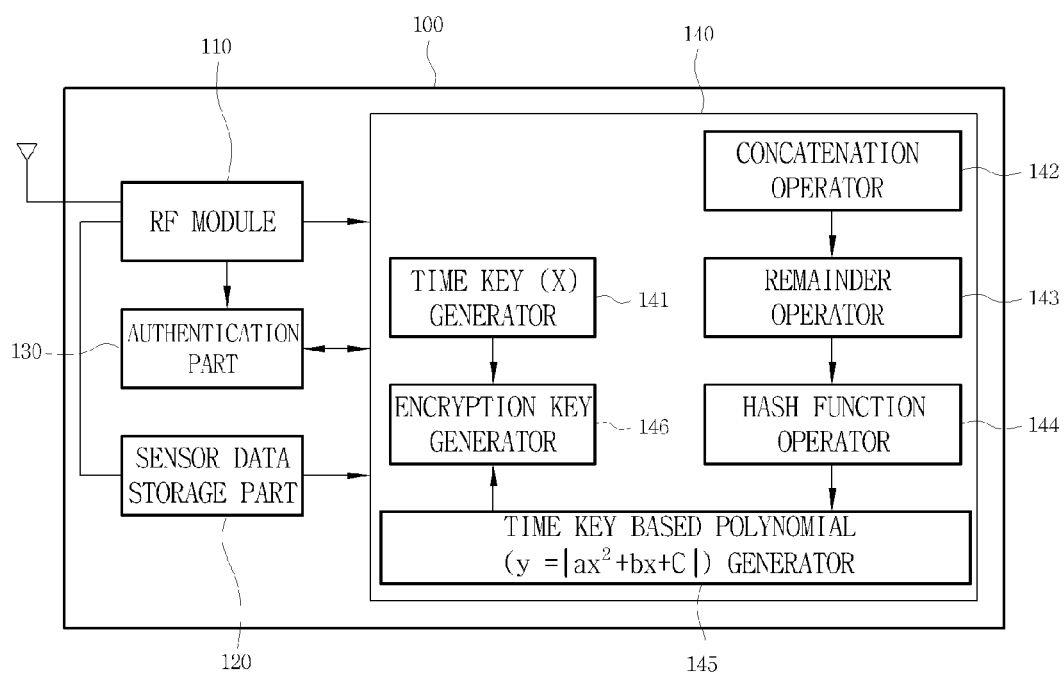
FIG. 2 is a simplified block diagram of a sensor node in the time key based key management system of FIG. 1.
Figure 3:
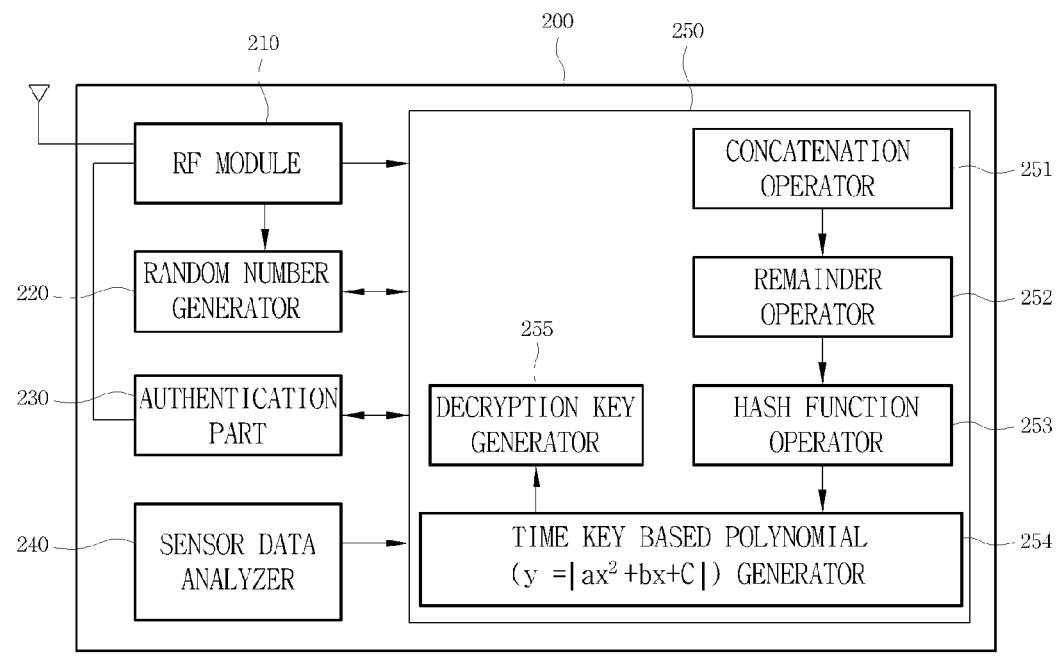
FIG. 3 is a simplified block diagram of an application in the time key based key management system of FIG. 1.

FIG. 2 is a simplified block diagram of the sensor node in the time key based sensor data security preserving system of FIG. 1, and FIG. 3 is a simplified block diagram of the application system in the time key based sensor data security preserving system of FIG. 1. The simplified block structure including the sensor node 100 and the application system 200 for the time key based sensor data security preserving method is now explained by referring to FIGS. 2 and 3.

In FIG. 2, the sensor node 100 includes an RF module 110, a sensor data storage part 120, an authentication part 130, and an encryption part 140. Each sensor node 100 has an initial group key Kg and a private key Kp, which are already known to the application system 200 and the sink node 300.

The RF module 110 collects the sensor data detected through the sensor. The RF module 110 receives the application random number p generated at the application system 200 and the sink random number q generated at the sink node 300.

The sensor data storage part 120 stores the sensor data received at the RF module 110. When the encryption key is generated, the sensor data storage part 120 provides the sensor data to the encryption part 140 so that the sensor data is encrypted.

The authentication part 130 generates material of the authentication key by applying the random number q received from the sink node 300 to a Hash function, and generates the authentication key Kq using an authentication function used by the sensor node 100.

The encryption part 140 includes a time key generator 141, a concatenation operator 142, a remainder operator 143, a Hash function operator 144, a time key based polynomial generator 145, and an encryption key generator 146.

The concatenation operator 142 performs the concatenation operation by receiving the random numbers p and q from the application system 200 and the sink node 300. When the time key based polynomial is, for example, a quadratic polynomial, the concatenation is carried out to obtain two roots of the quadratic polynomial to derive the quadratic polynomial. As a result of the concatenation, p is split to $p_a$ and $p_b$ and q is split to $q_a$ and $q_b$.

The remainder operator 143 remainder-operates the concatenation results and the secret key C. Hence, it is advantageous that the concatenation results $p_a$, $p_b$, $q_a$ and $q_b$ are greater than the secret key C. Herein, the secret key C is the value shared by the sensor node 100 and the application system 200 before the sensor node 100 configures the network.

The Hash function operator 144 obtains two roots of the quadratic polynomial by applying the remainder operation result to the Hash function. That is, when the quadratic polynomial is expressed as a quadratic function, the Hash function operator 144 calculates two coordinates $(p_x, p_y)$ and $(q_x, q_y)$ in the quadratic function curve.

The time key based polynomial generator 145 generates a time key based polynomial using the two coordinates $(p_x, p_y)$ and $(q_x, q_y)$, which are the results of the Hash function operation, and the secret key C shared by the sensor node 100 and the application system 200.

The encryption key generator 146 generates a material value of the encryption key using a certain time key xi as the input value of the time key based polynomial, and generates an encryption key with the generated encryption key material value using the cryptographic algorithm used by the sensor node 100.

Referring to FIG. 3, the application system 200 includes an RF module 210, a random number generator 220, an authentication part 230, a sensor data analyzer 240, and a decryption part 250.

The RF module 210 receives the sink random number q from the sink node 300, the encrypted sensor data and the encrypted time key sent to the sink node 300.

The random number generator 220 generates the application random number p. Accordingly, the application system 200 has its generated random number p and the random number q received from the sink node 300. In addition to the random numbers p and q, the application system 200 also shares the secret key C with the sensor node 100.

The authentication part 230 generates the authentication key by applying the sink random number q received from the sink node 300 to the Hash function, and verifies the received time key and the received sensor data with the authentication key.

When the decryption part 250, to be explained, generates a decryption key, the sensor data analyzer 240 can recognize the sensor data by cracking the encrypted sensor data with the decryption key.

The decryption part 250 includes a concatenation operator 251, a remainder operator 252, a Hash function operator 253, a key generation polynomial generator 254, and a decryption key generator 255. The components of the decryption part 250 have been explained in FIG. 2.

Figure 4:
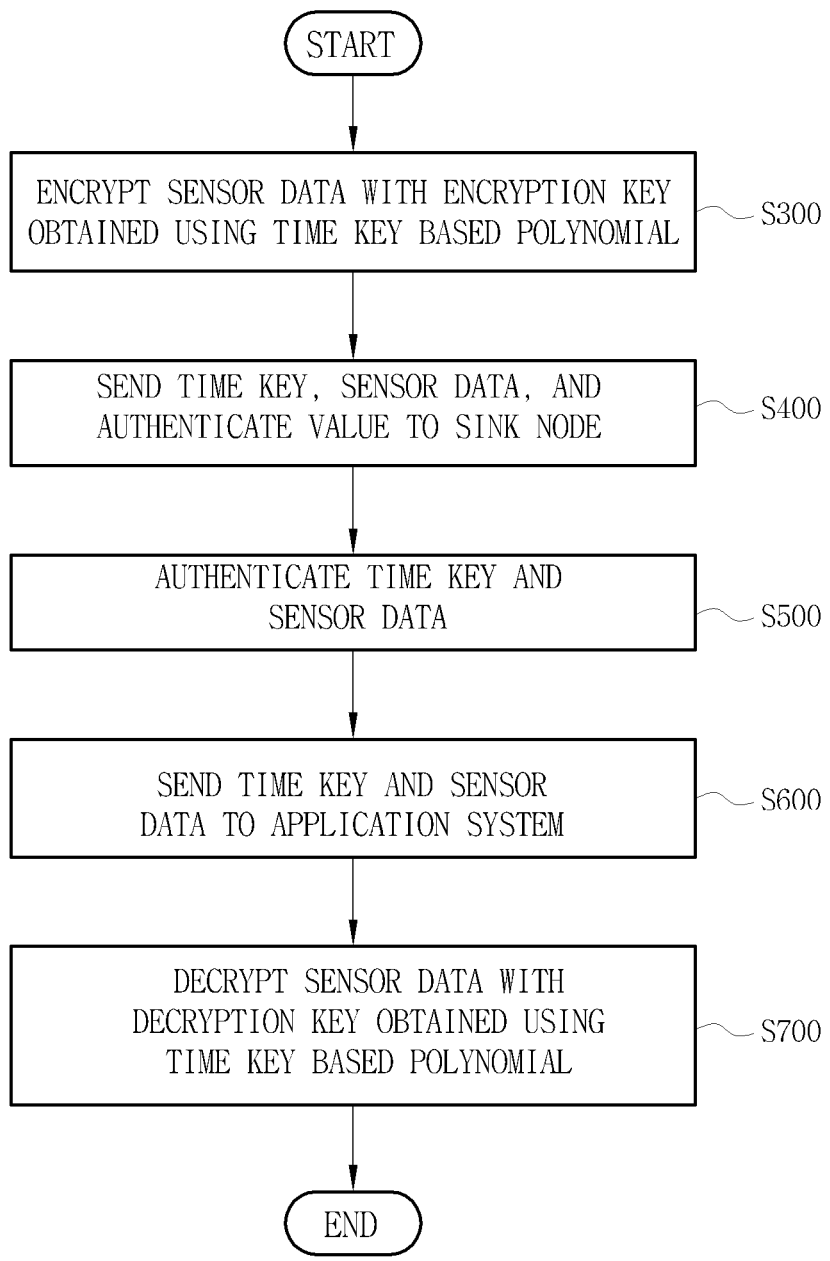
FIG. 4 is a simplified flowchart of a time key based key management method in the ubiquitous sensor network according to an exemplary embodiment of the present invention.
Figure 5:
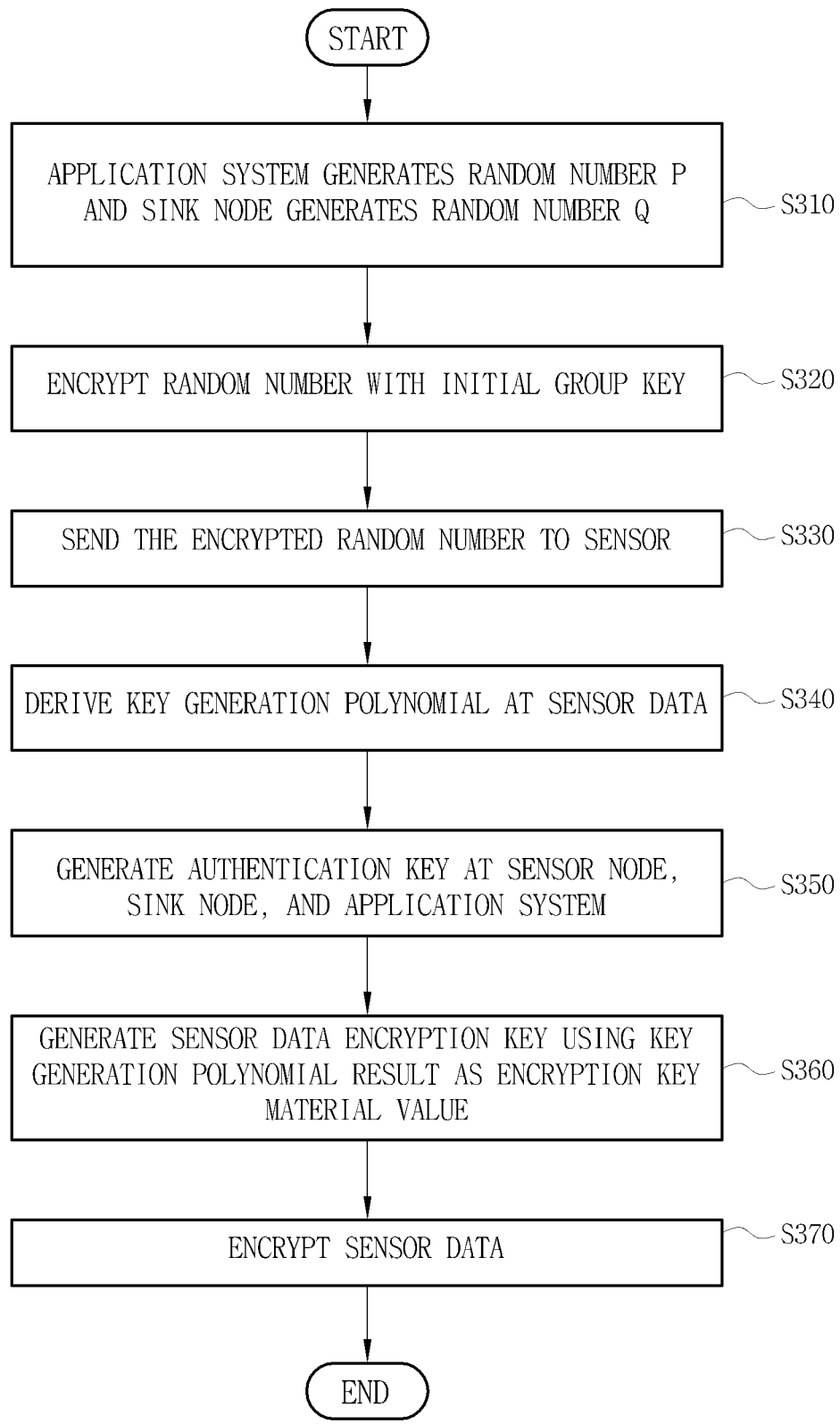
FIG. 5 is a flowchart of a sensor node initialization step before data is transmitted from the sensor node to a sink node according to the key management method of FIG. 4.

FIG. 4 is a simplified flowchart of a time key based key management method in the ubiquitous sensor network according to an exemplary embodiment of the present invention, and FIG. 5 is a flowchart of a sensor node initialization step before data is transmitted from the sensor node to the sink node according to the key management method of FIG. 4.

In FIG. 4, to send the sensor data to the application according to the time key based key management method in the ubiquitous sensor network, the sensor node performs the initialization step by encrypting the sensor data with the encryption key obtained from the time key based polynomial (S300). The encryption of the sensor data is explained first by referring to FIG. 5.

Referring to FIGS. 1B and 5, the application system 200 generates and sends the application random number p to the sensor node 100, and the sink node 300 generates the sink random number q (S310). The random numbers p and q are used to derive the polynomial to generate the encryption key.

The generated random numbers are encrypted with the initial group key Kg of the sensor node 100 (S320) and then transmitted (S330). The random number p generated at the application system 200 is sent to the sensor node 100. The random number q generated at the sink node 300 is sent to the application system 200 and the sensor node 100.

Hence, the sensor node 100 and the application system 200 have both of the random number p and the random number q. The sink node 300 has only its generated random number q. Besides the random number p and the random number q, the sensor node 100 and the application system 200 share the secret key C together before the sensor node 100 configures the network. Since the sensor node 100 and the application system 200 have the same key value as above, they can derive the same key generation polynomial, to be explained finally The sensor node 100 receiving the encrypted random numbers p and q, derives the key generation polynomial to create the encryption key (S340).

Figure 6:
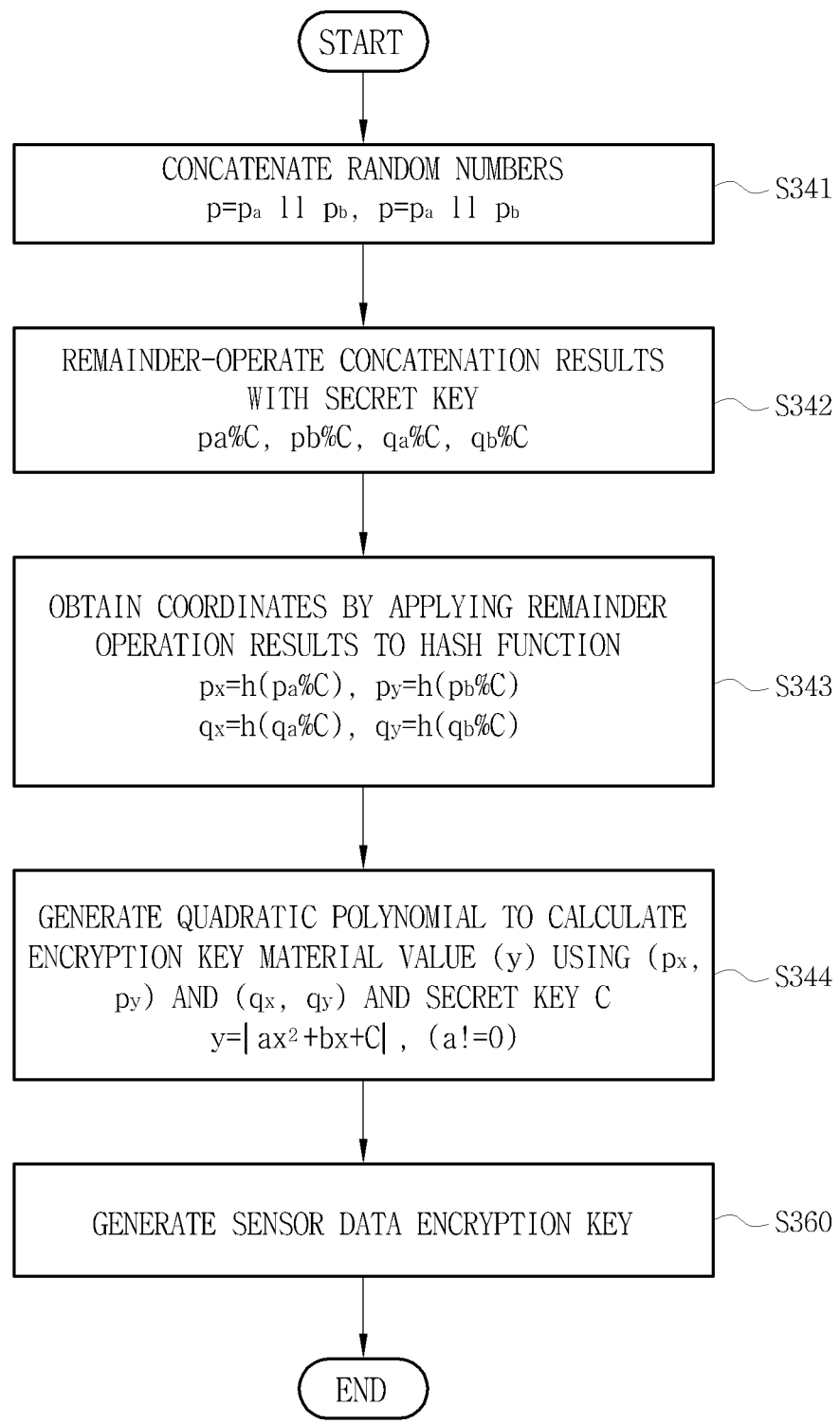
FIG. 6 is a flowchart of a method for encrypting the sensor data at the sensor node according to the key management method of FIG. 4.

Referring now to FIG. 6, the process for deriving the key generation polynomial and the process for generating the encryption key using the derived key generation polynomial and encrypting the sensor data are illustrated. FIG. 6 is a flowchart of a method for encrypting the sensor data at the sensor node according to the key management method of FIG. 4.

Referring to FIGS. 1B, 2 and 6, using the encryption key generated at the encryption part 140 of the sensor node 100, the sensor data to send to the sink node 300 is encrypted.

The concatenation operator 142 concatenates the random numbers p and q received via the RF module 110 of the sensor node 100 (S341). The concatenation splits the random number p to $p_a$ and $p_b$ and the random number q to $q_a$ and $q_b$ using, for example, $p=p_a\|p_b$. The concatenation is carried out to derive the quadratic polynomial to generate the encryption key using the random numbers. To derive the quadratic polynomial $y=ax^2+bx+C$, when two roots (or two coordinates in the quadratic function curve) of the quadratic polynomial; that is, the quadratic function and the constant value C are known, coefficients a and b of the quadratic polynomial are obtained to thus complete the quadratic polynomial.

The remainder operator 143 remainder-operates the concatenation results and the secret key C (S342). The remainder operation is applied to the concatenation results; that is, $p_a$, $q_a$, $p_b$, and $q_b$ with the secret key C respectively. The secret key C is not recognized by the sink node 300, and is shared by the sensor node 100 and the application system 200. The remainder operation is expressed as $p_a\%$ C, $p_b\%$ C, $q_a\%$ C and $q_b\%$ C as the concatenation results of the random numbers p and q. Since $p_a$, $p_b$, $q_a$ and $q_b$ are remainder-operated with the secret key C, a condition of $p_a$, $p_b$, $q_a$, $q_b > C$ is attached. For example, when the random number p=100, p is concatenated to $p_a=50$ and $p_b=50$ and each value is remainder-operated with C (an integer less than 50).

The Hash function operator 144 obtains a Hash value; that is, coordinates by applying the results of the remainder operation to the Hash function (S343). The Hash function is an operation for generating a fixed-length pseudorandom number in a given context, where the generated value is refereed to as a Hash value. By applying the Hash function to the remainder operation results, the two roots of the quadratic polynomial aforementioned; that is, two coordinates $(p_x, p_y)$ and $(q_x, q_y)$ in the quadratic function curve are produced. This operation is given by the following equations.

$$p_x = h(p_a \% C) \quad \text{[Equation 1]}$$

$$p_y = h(p_b \% C) \quad \text{[Equation 2]}$$

$$q_x = h(q_a \% C) \quad \text{[Equation 3]}$$

$$q_y = h(q_b \% C) \quad \text{[Equation 4]}$$

$p_x$, $p_y$, $q_x$ and $q_y$ are Hash values corresponding to the coordinates, h is the Hash function, $p_a$, $p_b$, $q_a$ and $q_b$ are the concatenation results of the random numbers p and q, C is the secret key shared by the application system 200 and the sensor node 100, and % is a remainder operator.

To generate the encryption key using the Hash values obtained from the Hash operation; that is, the coordinates ($p_x$, $p_y$) and ($q_x$, $q_y$) and the secret key C, the key generation polynomial generator 145 derives the following time key based polynomial (S344). A value output using the time key generated at the time key generator 141 as the input value of the quadratic polynomial of Equation 5, is the material value to generate the encryption key.

$$y=|ax^2+bx+C|(a!=0) \qquad \text{[Equation 5]}$$

In Equation 5, y is the material value used to derive the encryption key as the output value for the input of the time value x, a and b are coefficients of the quadratic polynomial, x is the time value, and C is the secret key shared by the sensor node 100 and the application system 200.

The quadratic polynomial is derived based on the three components including the random numbers p and q and the secret C, and can be generated commonly at the sensor node 100 and the application system 200. However, since the sink node 300 has only the random number q of the three components and has no random number p and no secret key C, it cannot derive the quadratic polynomial. Even when the random number p is exposed in the process of the data transmission, the secret key C is unknown. Thus, the sink node 300 cannot derive the quadratic polynomial.

When the encryption material value is derived from the time key based polynomial, the encryption key generator 146 generates the sensor data encryption key by applying the encryption material value to a certain cryptographic algorithm used by the sensor node 100 (S360).

Figure 7:
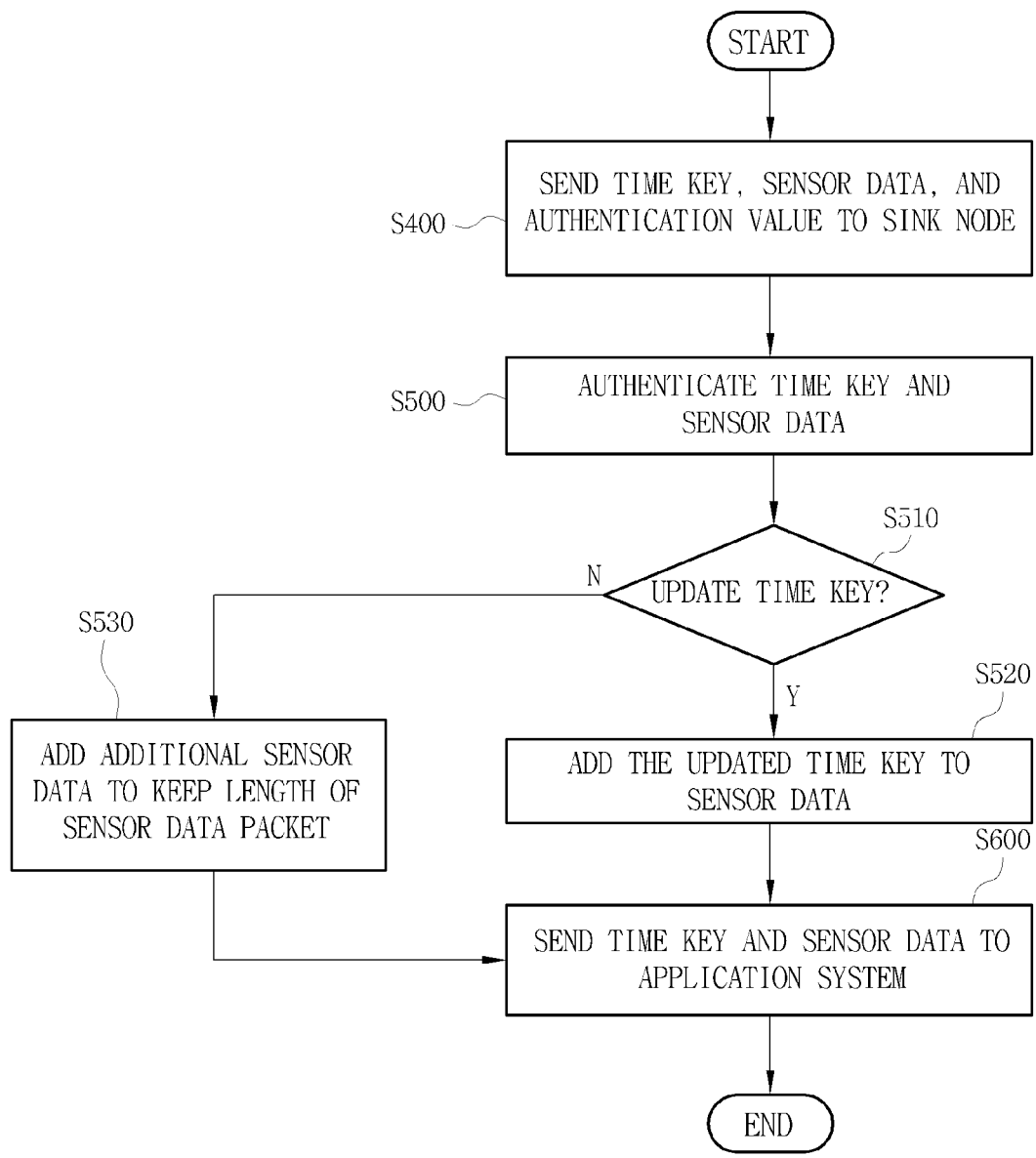
FIG. 7 is a flowchart of a method for sending the sensor data at the sensor node according to updating of the time key according to the time key based key management method of FIG. 4.

Referring now to FIGS. 4 and 7, the sensor data transmission from the sensor node 100 to the application system 200 via the sink node 300 is illustrated.

Referring to FIGS. 1B, 4 and 7, when the sensor node 100 encrypts the sensor data, the encrypted sensor data and the time key xi used to generate the encryption key are encrypted and sent to the sink node 300 (S400).

The sink node 300 shares the random number q with the sensor node 100, and the sink node 300 and the sensor node 100 generate the encryption key material by applying the sink random number q to the Hash function h(q) and generate the authentication key Kq using a certain authentication function. The time key xi is encrypted with the authentication key Kq. The sensor node 100 sends the encrypted sensor data and the encrypted time key xi together with the authentication value of the sensor data using the authentication key Kq (S400).

The sink node 300 receiving the sensor data and the time key xi, authenticates the sensor data and the time key xi with its own authentication key Kq (S500) and then stores them.

Among the time key, the sensor data, and the authentication value received from the sensor node 100, the sink node 300 sends the time key and the sensor data to the application system 200. The sink node 300 sends the encrypted sensor data and time key to the application system 100 on the periodic basis or according to the request of the application system 200 (S600).

Meanwhile, the time key xi used as the input value of the quadratic polynomial to generate the key value as mentioned above, is updated and input periodically. Likewise, the random numbers p and q are also updated on the periodic basis. By periodically updating the random numbers and the time key value, freshness of the key value can be ensured.

It is preferred that the update period of the random numbers p and q is longer than the change period of the time key x. The time key xi is updated by merely changing the input value of the quadratic polynomial, whereas the change of the random numbers p and q alters the quadratic polynomial itself. New generation of the quadratic polynomial requires relatively more energy than the simple change of the time key x.

The encryption key can be continuously changed by merely altering the time key x. The quadratic polynomial itself is changed by periodically changing the random numbers p and q because an external intrusion node may analyze the pattern of the result value according to the change of the time key x and thus the quadratic polynomial itself may be exposed. Hence, by periodically altering the random numbers together with the time key, it is possible to block the eavesdropping, the forging, and the falsification of the data against the hacking of the external attacker, apart from the freshness of the key value.

As sending the encrypted time key and sensor data to the application system 200, the sink node 300 considers the updating of the main key values p, q and x. That is, when the time key x is updated to a new time key (S510:YES), the sink node 300 adds the time key to the encrypted sensor data packet and sends the packet to the application system 200 (S600). The newly updated time key is added to the sensor data packet so as to maintain a constant packet length.

However, the time key is periodically changed, and the time key is not updated every time the data is transmitted. When the time key is not updated (S510:NO), the sink node 300 adds additional sensor data (S530) and sends the packet (S600) so as to keep the constant packet length, without adding the time key to the sensor data. That is, only when the time key is updated, the changed time key is transmitted from the sink node 300 to the application system 200. When the time key is not changed, the encryption key is not changed either because the value input to the quadratic polynomial is not changed.

Of the packet sent to the application system 200, the presence or the absence of the time key can be determined based on a flag indicator in the packet.

Figure 8:
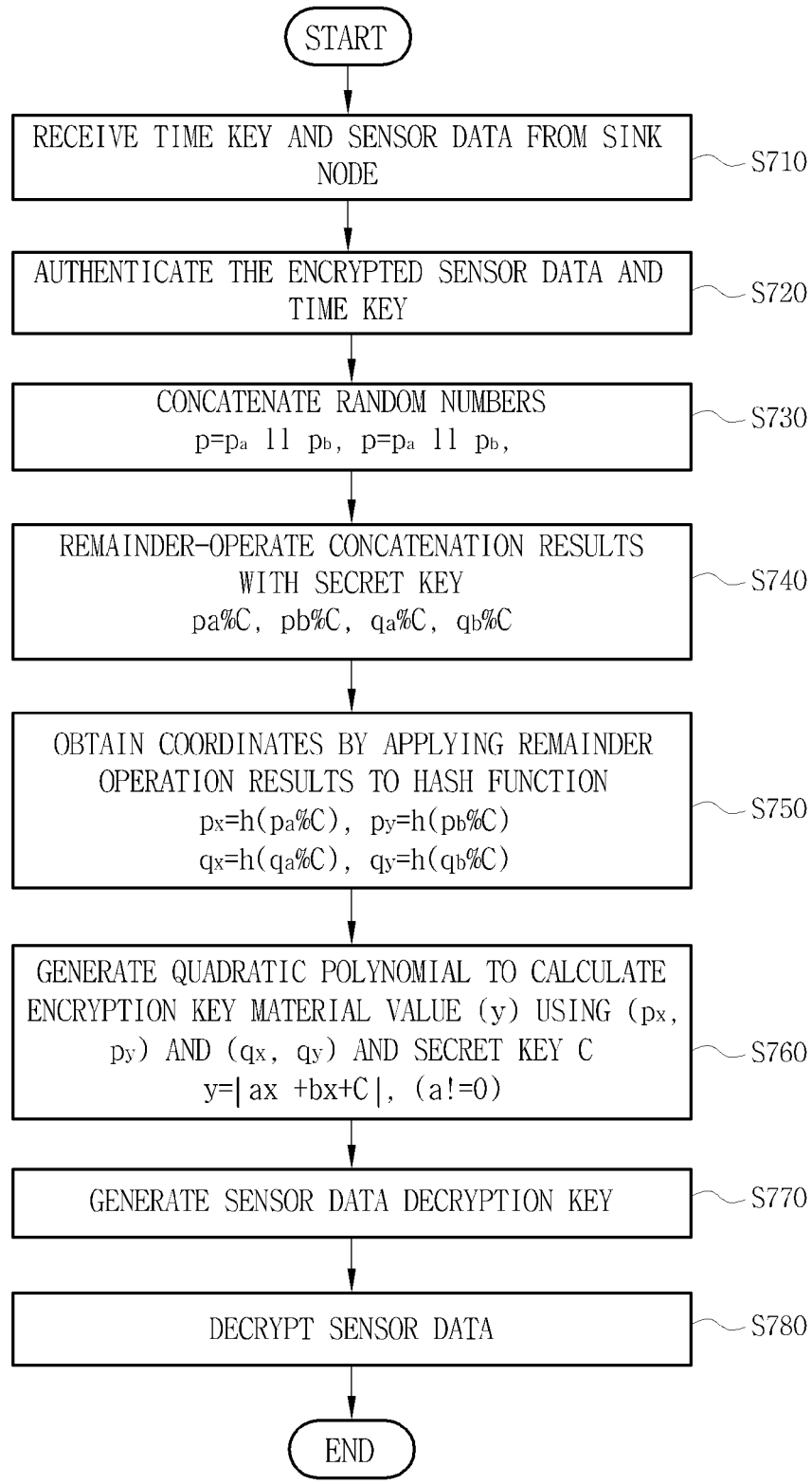
FIG. 8 is a flowchart of a method for decrypting the encrypted sensor data in the application system according to the key management method of FIG. 4.

FIG. 8 is a flowchart of a method for decrypting the encrypted sensor data in the application system according to the key management method of FIG. 4.

Referring to FIGS. 1B, 3 and 8, upon receiving the time key and the sensor data from the sink node 300 (S710), the application system 200 authenticates the received time key and sensor data using the random number q received from the sink node 300 (S720).

When the authentication is completed, the decryption part 250 generates the decryption key using the random number p generated by the application system 200 and the random number q received from the sink node 300. The derivation of the quadratic polynomial to create the decryption key is the same as the derivation of the quadratic polynomial to create the encryption key at the sensor node 100.

The concatenation operator 251 concatenates the random numbers p and q (S730). The remainder operator 525 conducts the remainder operation with the concatenation results and the secret key C (S740).

By applying the results of the remainder operation to the Hash function, the Hash function operator 253 obtains the Hash values; that is, the coordinates (S750).

The key generation polynomial generator 254 derives the quadratic polynomial (see Equation 3) generated at the sensor node 100 using the obtained coordinates ($p_x$, $p_y$) and ($q_x$, $q_y$) and the secret key C (S760). The output value produced using the time key received at the sink node 300 as the input value of the quadratic polynomial is the material value for generating the decryption key.

The decryption key generator 255 generates the sensor data decryption key by applying the decryption key material value to the cryptographic algorithm used at the application system 200 (S770). The encrypted sensor data is decrypted with the generated decryption key (S780).

Meanwhile, a recording medium containing a program to execute the time key based sensor data security preserving method in a computer system which controls the ubiquitous sensor network, can employ various recording media readable by the computer system.

Also, the recording medium can contain a program to execute the encryption generation method including the concatenation operation, the remainder operation, the Hash operation, and the derivation of the key value generation polynomial using the random numbers and the secret key at the sensor node 100. Besides, the application system 200 can be implemented using a recording medium containing a program to execute the decryption key generating method in the same manner as in the sensor node 100.

As set forth above, by deriving the sensor data and the common encryption key of the application system from the time key based key generation polynomial, the sensor node can transmit the sensor data to the application system safely.

In other words, even when the initial group key and the private key of the sensor node are exposed and the random number is exposed, the confidentiality and the integrity of the sensor data transmitted from the sensor node can be enhanced by blocking the encryption key or the authentication key of the sensor node from being exposed.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for preserving security of sensor data in a ubiquitous sensor network based on a time key, comprising automated computer-implemented steps of:
encrypting the sensor data with an encryption key obtained using a time key based polynomial derived using random numbers and a secret key which is shared by a sensor node and an application system;
sending the time key and the encrypted sensor data from the sensor node to a sink node, which does not have access to the secret key;
sending the encrypted sensor data and the time key, via the sink node, to the application system; and
decrypting the encrypted sensor data with a decryption key obtained by deriving the same polynomial as the time key based polynomial using the random numbers and the secret key, wherein the deriving of the time key based polynomial comprises:
calculating two coordinates ($p_x$, $p_y$) and ($q_x$, $q_y$) which are roots of the following quadratic polynomial using the application random number p and the sink random number q; and
deriving the following equation using the two coordinates and the secret key shared by the sensor node and the application, $$y=|ax^2+bx+C|$$

where y, which is an output value for a time key input, is the material value used to generate the encryption key, a and b are coefficients of the quadratic polynomial, x is a certain time key value, C is the secret key value as a constant value of the quadratic polynomial, and $|x|$ denotes an absolute value of x.

2. The method of claim 1, wherein the time key is generated using sensor data collection time information, and is an input value of the time key based polynomial which produces an encryption key material value used to generate the encryption key as an output value.

3. The method of claim 1, wherein the encrypting of the sensor data comprises:
generating an application random number p and a sink random number q;
encrypting the generated random numbers with an initial group key of a sensor node and sending the encrypted random numbers to the sensor node;
deriving the time key based polynomial to generate a sensor data encryption key at the sensor node;
generating, at the sensor node, an authentication key using the sink random number q;
providing the sink random number q to the sink node and an application system; and
generating the encryption key by applying the encryption key material value calculated using the time key based polynomial to a cryptographic algorithm of the sensor node.

4. The method of claim 3, wherein the encrypting and sending of the random numbers comprises:
sending the application random number p from the application system to the sensor node; and
sending the sink random number q from the sink node to the application system and the sensor node.

5. The method of claim 3, wherein the application random number p, the sink random number q, and the time key x are updated periodically, and an update period of the time key is shorter than an update period of the random numbers p and q.

6. The method of claim 1, wherein the calculating of the coordinates comprises:
concatenating the application random number p and the sink random number q;
remainder-operating results of the concatenation and the secret key; and
calculating coordinates by applying a Hash function to the remainder-operating results.

7. The method of claim 1, wherein the decrypting of the sensor data comprises: deriving the same polynomial as the time key based polynomial generated at the sensor node;
generating the decryption key by applying a decryption key material value obtained from the time key based polynomial to a cryptographic algorithm of the application system; and
decrypting the encrypted sensor data with the generated decryption key.

8. The method of claim 1, wherein the sending of the encrypted sensor data and the encrypted time key to the application system transmits the encrypted sensor data on a periodic basis or according to a request of the application system.

9. The method of claim 1, wherein the sending of the encrypted sensor data and the encrypted time key to the application system maintains a constant packet length by adding the time key to a sensor data packet, and when the time key is updated to a new time key, the updated time key is added to the sensor data packet and transmitted.

10. The method of claim 9, wherein whether the new time key contained in the sensor data packet is determined by a flag of the sensor data packet.

11. The method of claim 9, wherein, when the time key is not updated, additional sensor data is added to the sensor data packet to maintain the constant packet length and transmitted.

12. The method of claim 1, wherein the sensor node has an initial group key recognized by the application system and the sink node, and a private key.

13. The method of claim 1, wherein the sensor node shares the secret key with the application system.

14. A non-transitory recording medium containing a program to execute the time key based sensor data security preserving method according to claim 1 in a computer system which controls a ubiquitous sensor network, the recording medium readable by the computer system.

15. A system for preserving security of sensor data in a ubiquitous sensor network based on a time key, comprising:
a sensor node having an RF module with an RF receiver operative to receive the sensor data, the sensor node being operative to encrypt the sensor data with an encryption key obtained using a time key based polynomial derived using at least one random number from an application system and/or a sink node and a secret key shared by said sensor node and said application system;
said sink node having an RF module with an RF receiver operative to receive the encrypted sensor data and said time key from the sensor node, the sink node, which does not have access to the secret key, being operative to authenticate said time key, and send the encrypted sensor data and the time key to the application system;
said application system having an RF module with an RF receiver operative to receive the encrypted sensor data, the application system being operative to decrypt the encrypted sensor data with a decryption key obtained by deriving the same polynomial as the time key based polynomial using the random number and the secret key; and
an encryption part for generating an encryption key using the random number and the time key, wherein the encryption part comprises:
a time key generator for generating the time key using time information according to a certain rule;
a concatenation operator for splitting the random number to two random numbers;
a remainder operator for performing remainder operation by dividing results of the concatenation by a secret key;
a Hash function operator for obtaining coordinates by applying the Hash function to results of the remainder operation;
a time key based polynomial generator for generating a quadratic polynomial which produces an encryption key material value y using the coordinates and the secret key; and
an encryption key generator for generating an encryption key by applying the encryption key material value to a cryptographic algorithm used by the sensor node.

16. The system of claim 15, wherein the time key is generated using sensor data collection time information, and the time key is an input value of the time key based polynomial which produces an encryption key material value as an output value.

17. The system of claim 16, wherein:
the RF module is operative to receive, via the RF receiver, random numbers from the application system and the sink node; and
the sensor node further comprises:
a sensor data storage part for storing the sensor data; and
an authentication part for generating an authentication key by applying the random number to a Hash function.

18. The system of claim 15, wherein:
the RF module for receiving the sensor data and is operative to receive the time key; and
the application system further comprises:
an authentication part for generating an authentication key by applying the random number to a Hash function, and verifying the time key and the sensor data using the authentication key;
a decryption part for generating a decryption key using the random number and the time key; and
a sensor data analyzer for analyzing the sensor data using the decryption key.

19. A system for preserving security of sensor data in a ubiquitous sensor network based on a time key, comprising:
a sensor node having an RF module with an RF receiver operative to receive the sensor data, the sensor node being operative to encrypt the sensor data with an encryption key obtained using a time key based polynomial derived using a random number received from an application system and/or a sink node and a secret key received from an application system;
said sink node having an RF module with an RF receiver operative to receive the encrypted sensor data from the sensor node, the sink node, which does not have access to the secret key, being operative to authenticate a time key, and send the sensor data and the time key to the application system; and
said application system having an RF module with an RF receiver operative to receive the encrypted sensor data, the application system being operative to decrypt the encrypted sensor data with a decryption key obtained by deriving the same polynomial as the time key based polynomial using the random number and the secret key;
wherein the RF module for receiving the sensor data and is operative to receive the time key; and
wherein the application system further comprises: an authentication part for generating an authentication key by applying the random number to a Hash function, and verifying the time key and the sensor data using the authentication key; a decryption part for generating a decryption key using the random number and the time key; and a sensor data analyzer for analyzing the sensor data using the decryption key; and
wherein the decryption part comprises:
a concatenation operator for splitting the random number into two random numbers;
a remainder operator for performing remainder operation by dividing results of the concatenation by a secret key;
a Hash function operator for obtaining coordinates by applying the Hash function to results of the remainder operation;
a time key based polynomial generator for generating a quadratic polynomial which produces a decryption key material value y using the coordinates and the secret key; and
a decryption key generator for generating a decryption key by applying the decryption key material value to a cryptographic algorithm used by the application system.

* * * * *